J. R. MOFFITT.
Disintegrating Paper-Stock.

No. 219,170.                 Patented Sept. 2, 1879.

UNITED STATES PATENT OFFICE.

JOHN R. MOFFITT, OF CHELSEA, MASSACHUSETTS.

IMPROVEMENT IN DISINTEGRATING PAPER-STOCK.

Specification forming part of Letters Patent No. 219,170, dated September 2, 1879; application filed January 12, 1876.

*To all whom it may concern:*

Be it known that I, JOHN R. MOFFITT, of Chelsea, in the county of Suffolk and State of Massachusetts, have invented certain Improvements in Disintegrating Paper-Stock, of which the following is a specification.

Figure 1:
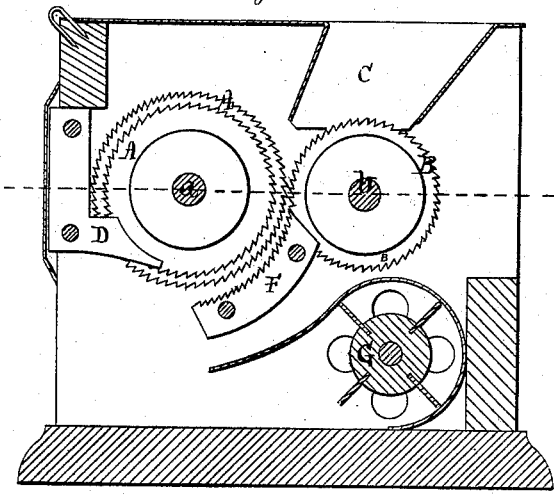
Figure 2:
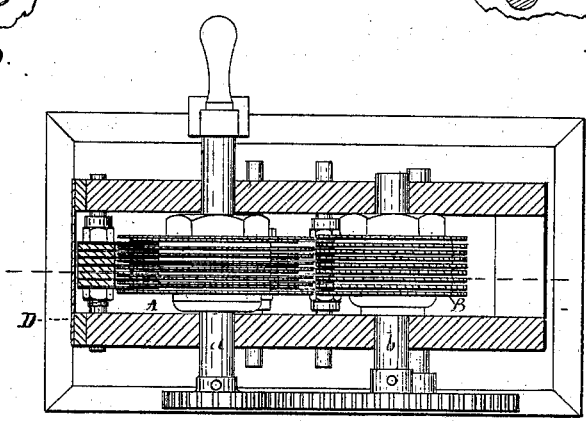

In the drawings, Figure 1 is a lengthwise vertical section of an apparatus especially adapted for preparing leather scraps for use in that kind of paper known as "leather-board." Fig. 2 is a plan of the same apparatus. The other figures show details of construction and modifications.

On the arbor $a$ are mounted a series of saws, A, so that each saw will revolve with the arbor $a$. These saws extend across the mouth of the hopper C, into which the leather scraps are fed. At the bottom of this hopper is a second series of saws, B, mounted upon the arbor $b$. These saws B are so arranged that the leather scraps deposited upon them will be carried around and into contact with the teeth of the saws A, by which the scraps will be disintegrated, each scrap being held by the teeth of the saws B while the teeth of the saws A are disintegrating it, the series of saws B being in reality a feeding device for feeding the material to the series of saws A, which latter series constitutes the disintegrating device.

The length of the fibers in the disintegrated stock depends mainly upon the length of the cutting-edge of each tooth, while the fineness of these fibers depends mainly upon the relative speed of the disintegrating and feeding devices. As it is essential that these fibers shall be extremely fine, the disintegrating-saws A should revolve much faster than the feeding-saw B. For leather scraps I revolve the saws A from twenty to forty times as fast as the saws B.

Figure 3:
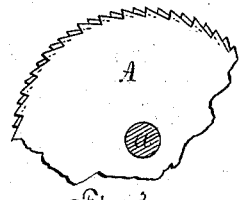

The disintegrating device is shown as consisting of a series of saws, the length of the cutting-edge of each tooth corresponding with the length of fiber desired in the disintegrated stock. Each saw is of a diameter different from that of its next neighbor; but this is mainly for the purpose of bringing the cutting-edge of each tooth out of line with the cutting-edges of the adjoining teeth, and is not essential where this disintegrating device is used with a feeding device different from that shown; but it is essential, when the saws are each of the same diameter, that they shall be so arranged that the cutting-edges of their teeth shall not form an unbroken line—that is, the cutting-edge of each tooth must be out of line with the cutting-edges of the adjoining teeth, as shown in Fig. 3.

For disintegrating leather scraps it is very desirable that the disintegrating device be in the form of a cylinder with grooves around it, in order that portions of the feeding device may lie in these grooves, the small tough pieces or scrap being thereby better held than in any other way known to me; but where sticks of wood are to be disintegrated it is not so important that portions of the feeding device shall project beyond the cutting-edges of the teeth.

It is also desirable to make the disintegrating device in the form of a cylinder with grooves around it and between the saws, for the reason that thereby clearers may be used between the saws. These clearers are marked D in the drawings. They serve to prevent the grooves from being filled up and to remove the fibers after they have been disintegrated from the teeth of the disintegrator.

The form of disintegrating device last above described is new with me to the best of my knowledge and belief.

The feeding device is also new with me to the best of my knowledge and belief. As shown in the drawings, it consists of a series of saws; but it will be observed that as these saws move backward in order to feed the material to the disintegrating device the teeth of these saws do not point in the same direction as that in which they move, and so are enabled to perform the function of holding the stock against the action of the teeth of the disintegrating device, and at the same time of feeding the stock to the disintegrating device, and in this consists its novelty. It is, in fact, a supporting-surface made up of a series of saws, but holds and carries the stock—that is, moves with it instead of operating upon it. The stock is securely held by it against the action of the disintegrating device, and it is the most convenient and simplest form of feeding device known to me for use in connection with my disintegrator. When used to feed wood the teeth should be made coarser, so as to give them a better hold upon the stick, and the sticks should be so placed as to present the grain of the wood parallel to the cutting-edges of the teeth of the disintegrator.

I prefer to separate each saw from its neighbors, as shown in the drawings, for the reason that clearers (marked F in the drawings) can then be used with this feeding device.

This method of disintegrating paper-stock, by feeding it slowly and uniformly forward to a rapidly-moving disintegrating device composed of saw-teeth arranged as above described, is also of my invention. This principle may be embodied in a great variety of apparatus, as all that is necessary is to feed the stock to a series of moving cutting-teeth each out of line with the one next to it, so that the length of the fiber shall depend upon the width of the cutting-teeth, and the fineness of the fiber upon the rate at which the material is fed to the cutting-teeth.

The disintegrated stock produced by tearing out short fibers in this way has in it, of course, more or less small pieces not properly disintegrated, and it is not fit for the paper-maker's use until these small pieces are removed—that is, if these small pieces were not removed the whole mass would require as much "beating up" as the stock before it was disintegrated, or else there would be lumps in the paper made from it. For this reason I use a winnower with my machine, so that as the product falls from the disintegrator into a current of air all the properly-disintegrated fiber is carried by this current to a suitable receptacle, the pieces not properly disintegrated falling through the current. In the apparatus shown in the drawings this current of air is produced by the fan G.

Figure 4:
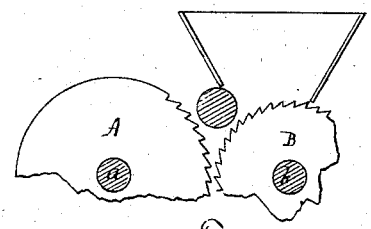

For feeding rags or shavings a presser should be used in connection with my feeding device, so arranged as to compress the material upon the holding-teeth, as indicated in Fig. 4.

For most kinds of stock clearers should be used not only between the saws of the disintegrator, but also between those of the feeding device.

What I claim as my invention is—

1. The feeding device made up of a series of saws placed together flatwise, with their teeth pointing in an opposite direction to that in which they move, and arranged to hold and move with the stock, as specified.

2. The combination of a disintegrator provided with saw-teeth and a device for feeding the material to be disintegrated provided with saw-teeth, the disintegrator and feed being arranged with their contiguous teeth pointing in different directions, substantially as above described.

3. The combination, with a disintegrator and feeding device, substantially such as above described, of the fan G, for the purpose of separating disintegrated paper-stock from the small pieces not properly disintegrated contained in it, as set forth.

4. The combination of the clearers D and F with the series of saw-blades A or B, substantially as above described.

5. The apparatus above described, consisting of the series of saws A and B, revolving in opposite directions, the clearers D and F, and the fan G, combined together substantially as described.

6. The apparatus above described, consisting of a disintegrator and a positive feeding mechanism, the whole arranged together as set forth, and adapted to make fibers of a given size, the size of the disintegrator-teeth governing the length of the fiber, and the comparative rate of speed of the disintegrator and the positive feed determining the fineness of the fiber, all as set forth.

7. The disintegrator above described, composed of a series of circular saws of the same diameter, between each two of which is a circular saw of a smaller diameter, all upon the same shaft and adapted for the purpose set forth.

8. As a new article of manufacture, dry paper-stock reduced to fine short fibers, as above described.

JOHN R. MOFFITT.

Witnesses:
J. E. MAYNADIER,
J. E. KNOX.